United States Patent
Nenasheva et al.

(10) Patent No.: US 8,067,324 B2
(45) Date of Patent: Nov. 29, 2011

(54) LOW DIELECTRIC LOSS CERAMIC FERROELECTRIC COMPOSITE MATERIAL

(76) Inventors: Elizaveta Arkadievna Nenasheva, Saint-Petersburg (RU); Aleksey Dmitrievich Kanareikin, Saint-Petersburg (RU)

(*) Notice: Subject to any disclaimer, the term of this patent is extended or adjusted under 35 U.S.C. 154(b) by 69 days.

(21) Appl. No.: 12/451,985

(22) PCT Filed: Nov. 26, 2007

(86) PCT No.: PCT/RU2007/000658
§ 371 (c)(1),
(2), (4) Date: Dec. 10, 2009

(87) PCT Pub. No.: WO2009/070047
PCT Pub. Date: Jun. 4, 2009

(65) Prior Publication Data
US 2010/0120606 A1 May 13, 2010

(51) Int. Cl.
*C04B 35/468* (2006.01)
*C04B 35/47* (2006.01)
(52) U.S. Cl. ......................... 501/138; 501/137
(58) Field of Classification Search .............. 501/137, 501/138
See application file for complete search history.

(56) References Cited

U.S. PATENT DOCUMENTS 5,833,875 A * 11/1998 Hayashi et al. ........ 252/62.9 PZ
6,774,077 B2 * 8/2004 Sengupta et al. ............. 501/137

FOREIGN PATENT DOCUMENTS

| CN | 101007736 | * | 8/2007 |
| JP | 53098098 | * | 8/1978 |
| JP | 61014169 | * | 1/1986 |
| JP | 08067556 | * | 3/1996 |
| JP | 2002193662 | * | 7/2002 |
| JP | 2002293618 | * | 10/2002 |
| JP | 2008069056 | * | 3/2008 |

* cited by examiner

*Primary Examiner* — Karl Group
(74) *Attorney, Agent, or Firm* — Vera Chernobylsky

(57) ABSTRACT

The ceramic ferroelectric composite material ensures the achievement of the technical result, consisting in a decrease in the level of the dielectric losses in the radio and microwave frequencies for the materials with the dielectric constant from 152 to 796 together with an increase in the tunability of the dielectric constant by the electric field. The ceramic ferroelectric composite material is produced from the composition including $BaTiO_3$ and $SrTiO_3$, which additionally includes the magnesium-containing mixture of magnesium orthotitanate $Mg_2TiO_4$ and magnesia MgO, with the following content of components, mass%: $BaTiO_3$ - 27.0 - 48.8; $SrTiO_3$ - 25.0 - 39.5; magnesium-containing mixture of $Mg_2TiO_4$ and MgO - the remainder, where the components in the magnesium-containing mixture have the following content, mass%: $Mg_2TiO_4$ - 6.2 - 92.4: MgO - the remainder.

1 Claim, 2 Drawing Sheets

LOW DIELECTRIC LOSS CERAMIC FERROELECTRIC COMPOSITE MATERIAL

FIELD OF THE INVENTION

The invention relates to the technology of the production of ceramic ferroelectric composite materials. It can be used in the electronics industry for the production of a broad class of electronic components and engineering devices controlled by an electric field.

PRIOR KNOWLEDGE

A ceramic composite material is known [RF Pat. No. 2,293,717, IC C04B 35/465, published Feb. 20, 2007] that includes $BaTiO_3$, $SrTiO_3$, and the solid solution of barium-lanthanide tetratitanate with the general formula $(Ba_{1-x}Sr_x)Ln_2Ti_4O_{12}$, where $0.2 \geq x \geq 0$ and Ln is a lanthanide from the range Nd-Sm with the following content of components (mass %):

$BaTiO_3$—40-60,
$SrTiO_3$—20-30,
$(Ba_{1-x}Sr_x)Ln_2Ti_4O_{12}$—the remainder.

Additionally, the ceramic composite material can contain $BaTi_4O_9$ in the amount of 1-5% or $Nd_2O_3 \cdot 3TiO_2$ in the amount of 5-25%.

A drawback in the above-indicated composite material is the relatively high level of dielectric losses in the radio and microwave frequency ranges, especially for compositions with am increased dielectric constant tunability. Furthermore, this composite material does not ensure the possibility of electronic device operation at the increased voltage of the biasing DC electrical field exceeding 1.8V/μm (18 kV/cm).

A ceramic composite material for electronic devices is known [U.S. Pat. No. 6,074,971, IC C04B35/053, published Jun. 13, 2000] that includes $BaTiO_3$, $SrTiO_3$ (solid solution), and magnesia containing additives.

The deficiencies of the known ceramic composite material described in the U.S. Pat. No. 6,074,971 are the narrow range of the dielectric constant ($\epsilon$=99-130) and insufficiently high tunability in a DC field.

A composite material is known for articles with DC electrically tunable thick films (from 2 to 25 micrometers) made of the tunable phases, such as barium-strontium titanate, and additional dielectric oxides [U.S. Pat. No. 6,737,179, IC B32B18/00, published May 5, 2004]. This material is the closest analog to the new composition and thus it was selected as the prototype of the proposed ceramic ferroelectric composite material. Thick films from the composite material can include multiple phases such as barium-strontium titanate and $MgTiO_3$, $Mg_2SiO_4$, $CaSiO_3$, MgO, $MgZrO_3$, $CaTiO_3$, $MgAl_2O_4$, and $MgSrZrTiO_5$. Furthermore, thick films can include additives like zirconates, stannates, rare earths, niobates, and tantalates, for example, $CaZrO_3$, $BaZrO_3$, $SrZrO_3$, $BaSnO_3$, $CaSnO_3$, $MgSnO_3$, $Bi_2O_3 \cdot 2SnO_2$, $Nd_2O_3$, $Pr_7O_{11}$, $Yb_2O_3$, $Ho_2O_3$, $La_2O_3$, $MgNb_2O_6$, $SrNb_2O_6$, $BaNb_2O_6$, $MgTa_2O_6$, $BaTa_2O_6$, and $Ta_2O_3$ in order to improve the electrical and microwave properties of thick film composites. The size of the particles in these films is to be controlled in order to optimize electrical and microwave properties. The compositions of electrically tunable thick films are to be made by screen-printing or spray deposition. It should be noted that the composite material for the electrically tunable thick films described in U.S. Pat. No. 6,737,179 has an increased level of dielectric losses at the frequencies of 1 MHz and 10 GHz, tan $\delta$=0.00046-0.00086 at the frequency of 1 MHz, and tan $\delta$=0.0077-0.025 at the frequency of 10 GHz.

The authors of the present invention considered improving the dielectric and microwave properties of a bulk material with a broad range of dielectric constant values by decreasing the level of the dielectric losses in the radio and microwave frequency ranges with the retention of the increased turnability and provision for the material operation at the increased voltage of the biasing DC electric field up to 40-50 kV/cm.

SUMMARY OF THE INVENTION

The technical result ensured by the invention consists in a decrease in the level of the dielectric losses in the radio and microwave frequencies for materials with a dielectric constant in the range of values from $\epsilon$=152 up to $\epsilon$=796, and in significant increase of the tunability of the dielectric constant at the high voltage of the applied biasing DC electric field.

At present, the patents and scientific literature provide no information about a ceramic ferroelectric composite material, which ensures a decrease in the level of dielectric losses at the frequencies of 1 MHz and 10 GHz, an increase in the tunability by a DC electric field due to the possibility of applying a high biasing voltage of up to 50 kV/cm to the bulk ceramic ferroelectric composite material with the dielectric constant in the range of values from $\epsilon$=150 to $\delta$=800 as a result of the increased dielectric strength of ferroelectric material, which ensures the ability to supply such high voltage to the sample.

As a result of the research, the authors revealed that the problems enumerated above can be solved by the development of a new material.

To achieve the technical result, the ceramic ferroelectric composite material is proposed. It is made from the composition, which includes $BaTiO_3$ and $SrTiO_3$ containing in addition the magnesium-containing mixture of magnesium orthotitanate $Mg_2TiO_4$ and magnesia MgO, with the following content of components, mass %:

| | |
|---|---|
| $BaTiO_3$ | 27.0-48.8 |
| $SrTiO_3$ | 25.0-39.5 |
| magnesium-containing mixture of $Mg_2TiO_4$ and MgO | the remainder, | where the components in the magnesium-containing mixture have the following content, mass %:

| | |
|---|---|
| $Mg_2TiO_4$ | 6.2-92.4 |
| MgO | the remainder. |

In contrast to the prototype, the proposed ceramic ferroelectric composite material contains a mixture of $Mg_2TiO_4$ and MgO, which includes the new component $Mg_2TiO_4$. It is exactly the reason that the turnability of the dielectric constant does not only drop, but moreover, to increase.

This is especially significant at the increased concentration of this component in the magnesium mixture and the simultaneously increased content of this mixture in the composite. Introduction of the new component $Mg_2TiO_4$ into the magnesium-containing mixture along with magnesia provides the development of ferroelectrics with small dielectric losses at the frequencies of both 1 MHz and 10 GHz together with the increased tunability of the dielectric constant by the applied DC electric field.

The indicated advantage of the proposed ceramic ferroelectric composite material is ensured by proper mixing of all components of the composition in the form of powders and the subsequent sintering of the obtained mixture in a single technological cycle. It also distinguishes the proposed material from the material selected as the prototype, where preliminarily formed solid solutions of barium-strontium titanates were used to produce the material.

Table 1 presents the compositions of the ceramic ferroelectric composite material.

Table 2 depicts the quantitative values of the electrical characteristics of the materials, which respectively have the compositions listed in Table 1.

Figure 1:
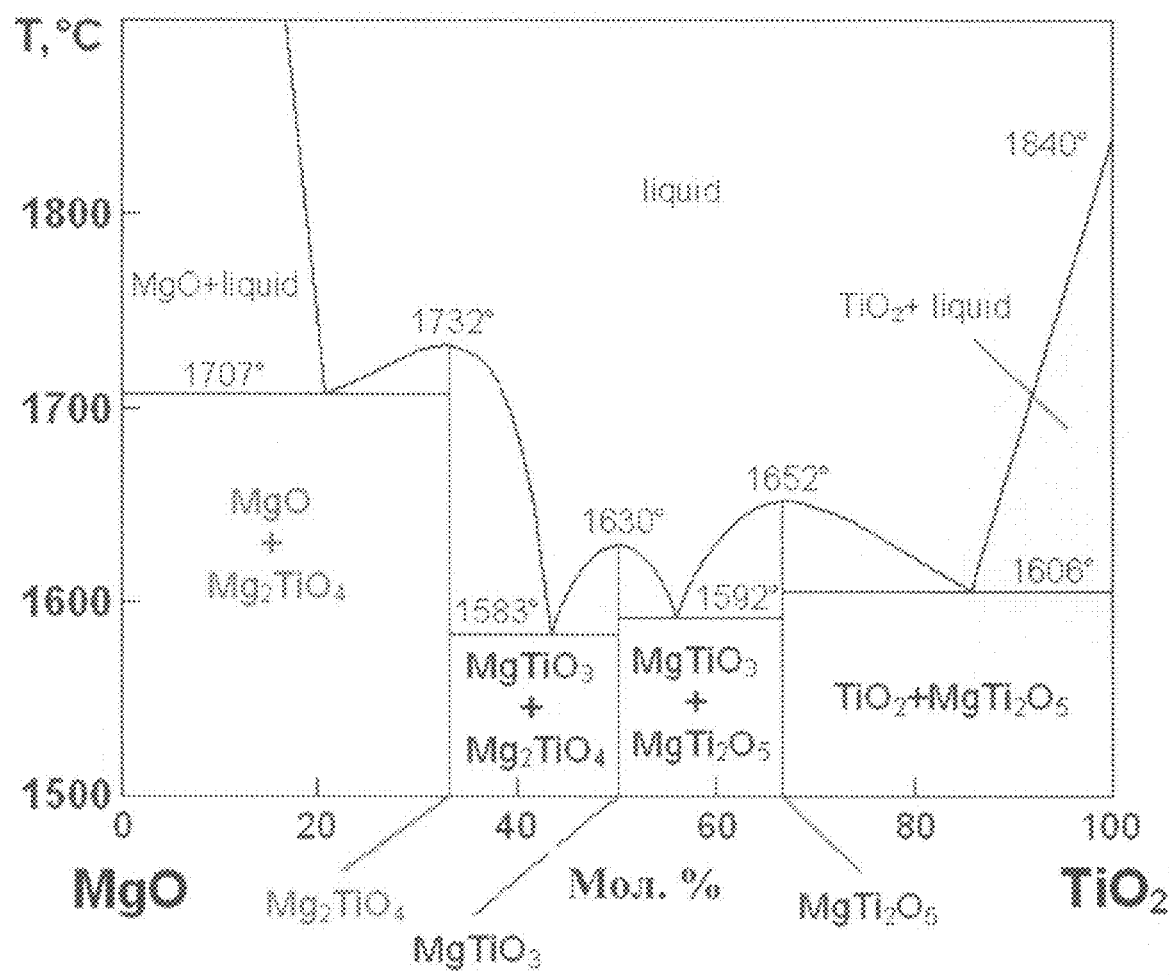
FIG. 1 represents the phase diagram in the MgO-$TiO_2$ system that confirms the absence of the chemical interaction of the components in the $Mg_2TiO_4$-MgO mixture in the temperature range up to 1700° C.

As can be seen from the phase diagram of the magnesium-titanium oxides system represented in FIG. 1, magnesium orthotitanate $Mg_2TiO_4$ is the highest temperature system among of all known magnesium titanates and it remains in the solid state up to 1732° C. It remains stable in the entire range of sintering temperatures of the composite from 1380° C. to 1450° C. Moreover, it is important to mention that magnesium orthotitanate $Mg_2TiO_4$ preserves this stability in the presence of magnesia MgO.

Figure 2:
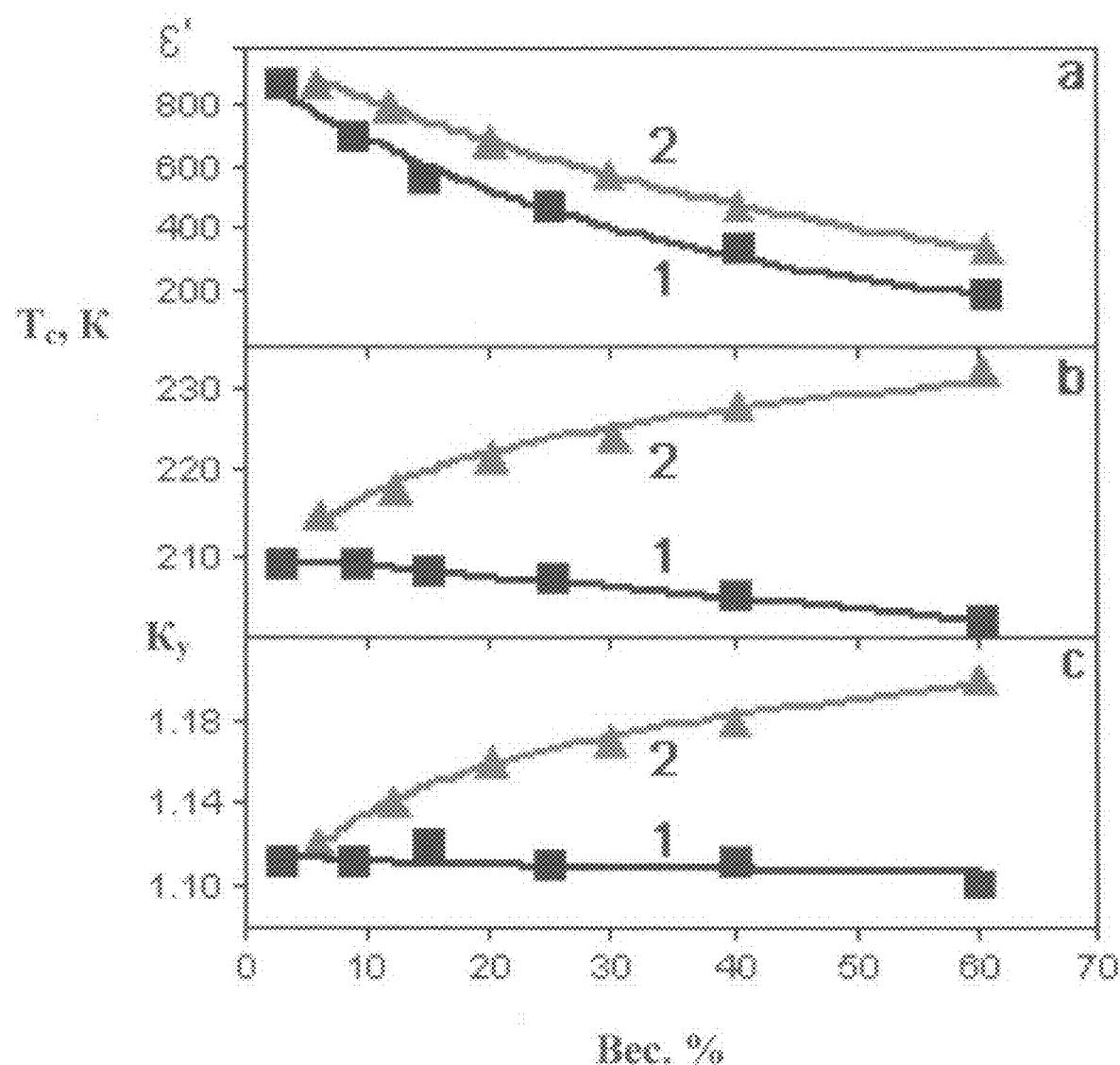
FIG. 2 represents the plots of the dependence of the dielectric constant ($\epsilon$), Curie point ($T_m$), and tunability coefficient ($K_t$) on the percentage of MgO (curve 1) and $Mg_2TiO_4$ (curve 2) for the composite mixtures of $BaTiO_3$ and $SrTiO_3$ in the range of compositions from 45.8% to 34.4% for $BaTiO_3$ and from 37.5% to 28.1% for $SrTiO_3$.

It is clearly evident from the experimental data represented as plots in FIG. 2, the combination of the components in the magnesium-containing mixture makes it possible to obtain a material with the declared numerical ratio of components with the wide range of dielectric constants from $\epsilon$~150 to $\epsilon$~800, and a broad range of tunability $K_t$ values up to $K_t$~1.18 at E=20 kV/cm.

The above-mentioned factors provide reaching the combination of the reduced dielectric losses at the frequencies of 1 MHz and 10 GHz with the range of dielectric constants from $\epsilon$=152 to $\epsilon$=796 with the increased tenability of the dielectric constant by a DC electric field of the proposed ceramic ferroelectric composite material, which contains magnesia together with barium and strontium titanates in the proposed concentration range.

DETAILED DESCRIPTION OF THE INVENTION

The possibility of the objective manifestation of the technical result with the use of the invention has been confirmed by reliable data illustrating the invention, which contain the information of the experimental basis obtained in the process of conducting studies employing the procedures common for this area of material studies.

According to the present invention, several mixtures were prepared to produce the ceramic ferroelectric composite material. The compositions are presented in Table 1.

TABLE 1

| | Content of composite material, mass % | | | Content of magnesium-containing mixture, mass % | |
|---|---|---|---|---|---|
| | | | Mg-containing mixture | | |
| No. | $BaTiO_3$ | $SrTiO_3$ | of $Mg_2TiO_4$ and MgO | $Mg_2TiO_4$ | MgO |
| 1 | 27.0 | 27.0 | 54.0 | 23.5 | 76.5 |
| 2 | 30.3 | 30.3 | 39.4 | 92.4 | 7.6 |
| 3 | 35.7 | 35.7 | 28.6 | 87.4 | 12.6 |
| 4 | 30.5 | 25.0 | 44.5 | 6.2 | 93.8 |
| 5 | 30.6 | 25.0 | 44.4 | 75.0 | 25.0 |
| 6 | 39.3 | 32.1 | 28.6 | 12.6 | 87.4 |
| 7 | 48.2 | 39.5 | 12.3 | 35.8 | 64.2 |
| 8 | 48.8 | 32.5 | 18.7 | 12.8 | 82.2 |
| 9 | 39.7 | 29.3 | 31.0 | 50.0 | 50.0 |
| 10 | 37.5 | 25.0 | 37.5 | 66.7 | 33.3 |
| 11 | 38.5 | 25.6 | 35.9 | 55.3 | 44.7 |
| 12 | 41.4 | 27.6 | 31.1 | 44.4 | 55.6 |

The initial components of the $BaTiO_3$-$SrTiO_3$ mixture are mixed in the vibrating mill for 3 hours with preliminarily synthesized magnesium orthotitanate $Mg_2TiO_4$ in accordance with the concentrations, % mass, indicated in Table 1. Next, a binder is introduced into this powder, for example, an aqueous solution of polyvinyl alcohol, and disk samples are made by hydraulic pressing with the specific pressure 0.8-1.0 $t/m^2$.

The obtained samples are sintered in the electric furnace in air atmosphere in the range of temperatures from 1380° C. to 1450° C. for 2-4 hours until zero water absorption is observed. To measure the electrical parameters of the samples they are covered with an argentiferous paste burnt in at a temperature of 840°±20°; as a result, electrodes are formed.

The measurement of the electrical parameters at the frequency of 1 MHz is carried out on the metallized samples by the bridge method with the use of standard measurement equipment.

The measurement of the electrical parameters at the frequency of 10 GHz is carried out by the method of waveguide-dielectric resonator on nonmetallized samples employing the procedure known in this branch (Public Register of the Russian Federation MI 00173-2000), corresponding to International Standard IEC.

The measurement of the coefficient of tunability ($K_t$) of the dielectric constant ($\epsilon$) by an applied biasing DC field with a voltage from 20-40 kV/cm to 50 kV/cm has been carried out with the samples metallized with gold vacuum deposition.

The tests of the samples of the ceramic ferroelectric composite material showed that it has the following characteristics:

tan$\delta$=0.00011-0.00030 at the frequency of 1 MHz and tan$\delta$=0.004-0.012 at the frequency of 10 GHz;

$\epsilon$=152-796;

$K_t$=1.07-1.22 at E=20 kV/cm to $K_t$=1.17-1.66 at E=50 kV/cm.

Table 2 gives the characteristics of the materials, which have the compositions indicated in Table 1, namely, the following characteristics: $\epsilon$—dielectric constant; tan$\delta$—dielectric loss tangent; $K_t$—coefficient of tunability.

TABLE 2

| No. | ε | tan δ F = 1 MHz | tan δ F = 10 GHz | $K_t$ 20 kV/cm | $K_t$ 30 kV/cm | $K_t$ 40 kV/cm | $K_t$ 50 kV/cm |
|---|---|---|---|---|---|---|---|
| 1 | 152 | 0.00011 | 0.004 | 1.07 | 1.10 | 1.12 | 1.17 |
| 2 | 241 | 0.00011 | 0.006 | 1.09 | 1.11 | 1.15 | 1.20 |
| 3 | 370 | 0.00016 | 0.005 | 1.08 | 1.10 | 1.13 | 1.19 |
| 4 | 190 | 0.00019 | 0.006 | 1.10 | 1.15 | 1.19 | 1.24 |
| 5 | 210 | 0.00016 | 0.009 | 1.14 | 1.20 | 1.29 | 1.42 |
| 6 | 390 | 0.00021 | 0.006 | 1.09 | 1.15 | 1.20 | 1.25 |
| 7 | 796 | 0.00022 | 0.009 | 1.11 | 1.16 | 1.19 | 1.24 |
| 8 | 604 | 0.00020 | 0.009 | 1.10 | 1.18 | 1.21 | 1.29 |
| 9 | 456 | 0.00018 | 0.008 | 1.14 | 1.21 | 1.29 | 1.37 |
| 10 | 278 | 0.00024 | 0.012 | 1.18 | 1.28 | 1.41 | 1.54 |
| 11 | 420 | 0.00030 | 0.011 | 1.22 | 1.31 | 1.48 | 1.66 |
| 12 | 469 | 0.00023 | 0.010 | 1.17 | 1.26 | 1.35 | 1.49 |

Thus, as can be seen from the characteristics of the samples of the obtained material presented in Table 2, the ceramic ferroelectric composite material possesses a low level of dielectric losses at the frequency of 1 MHz and 10 GHz, the wide range of dielectric constants from ε=152 to ε=796 and the increased tenability by the electric field up to $K_t$=1.66 at field strengths up to E=50 kV/cm.

In this case, as it follows from the characteristics given in the Table 2, the lowest loss tangent at frequencies of 1 MHz and 10 GHz is shown by the sample of ceramic ferroelectric composite material (with the composition indicated in Table 1 as No. 1) that includes $BaTiO_3$ and $SrTiO_3$, and additionally includes the magnesium-containing mixture of magnesium orthotitanate $Mg_2TiO_4$ with magnesia MgO with the following content of components, mass %:

| | |
|---|---|
| $BaTiO_3$ | 27.0 |
| $SrTiO_3$ | 27.0 | in this case the components in the magnesium-containing mixture have the following content, mass %:

| | |
|---|---|
| $Mg_2TiO_4$ | 23.3 |
| MgO | 76.5 |

The greatest tunability is shown by the sample of ceramic ferroelectric composite material (with the composition indicated in Table 1 as No. 11) that includes $BaTiO_3$ and $SrTiO_3$, and additionally includes the magnesium-containing mixture of magnesium orthotitanate $Mg_2TiO_4$ with magnesia MgO with the following content of components, mass %:

| | |
|---|---|
| $BaTiO_3$ | 38.5 |
| $SrTiO_3$ | 25.6 | in this case the components in the magnesium-containing mixture have the following content, mass %:

| | |
|---|---|
| $Mg_2TiO_4$ | 55.3 |
| MgO | 44.7 |

The invention claimed is:
1. Ceramic ferroelectric composite material produced from the composition containing $BaTiO_3$ and $SrTiO_3$, which additionally includes the magnesium-containing mixture of magnesium orthotitanate $Mg_2TiO_4$ and magnesia MgO, with the following content of components, mass%:

| | |
|---|---|
| $BaTiO_3$ | 27.0-48.8 |
| $SrTiO_3$ | 25.0-39.5 |
| magnesium-containing mixture of $Mg_2TiO_4$ and MgO | the remainder, | where the components in the magnesium-containing mixture have the following content, mass%:

| | |
|---|---|
| $Mg_2TiO_4$ | 6.2-92.4 |
| MgO | the remainder. |

* * * * *